(12) United States Patent
Glazko et al.

(10) Patent No.: US 7,143,178 B2
(45) Date of Patent: Nov. 28, 2006

(54) SYSTEM AND METHOD FOR DTX FRAME DETECTION

(75) Inventors: Serguei Glazko, San Diego, CA (US); Baaziz Achour, San Diego, CA (US); Yu Chuan Lin, Encinitas, CA (US)

(73) Assignee: Qualcomm Incorporated, San Diego, CA (US)

( * ) Notice: Subject to any disclaimer, the term of this patent is extended or adjusted under 35 U.S.C. 154(b) by 908 days.

(21) Appl. No.: 09/761,341

(22) Filed: Jan. 16, 2001

(65) Prior Publication Data

US 2002/0012330 A1 Jan. 31, 2002

Related U.S. Application Data

(60) Provisional application No. 60/215,377, filed on Jun. 29, 2000.

(51) Int. Cl.
*G06F 15/16* (2006.01)
(52) U.S. Cl. .................. 709/231; 709/232; 370/468
(58) Field of Classification Search ........... 370/252, 370/342, 206; 382/261; 709/231, 232
See application file for complete search history.

(56) References Cited

U.S. PATENT DOCUMENTS

| | | | |
|---|---|---|---|
| 6,335,990 B1 * | 1/2002 | Chen et al. ............ | 382/261 |
| 6,480,472 B1 * | 11/2002 | Jou et al. ............ | 370/252 |
| 6,731,948 B1 * | 5/2004 | Lee et al. ............ | 455/522 |

FOREIGN PATENT DOCUMENTS

| WO | 9927745 | 6/1999 |
|---|---|---|
| WO | 0108439 | 2/2002 |

\* cited by examiner

*Primary Examiner*—Jeffrey Pwu
*Assistant Examiner*—Karen Tang
(74) *Attorney, Agent, or Firm*—Philip Wadsworth; Bruce W. Greenhaus; Andrea L. Mays

(57) ABSTRACT

A system and method for detecting discontinuous transmission (DTX) frames. The inventive method includes the steps of receiving data transmitted in a plurality of frames; classifying each of the frames; analyzing the classification of a number of successive frames of the received data and providing a metric with respect thereto; and determining, in response to the metric, if a frame is a discontinuous frame. In the illustrative embodiment, the step of classifying includes the step of error checking the frames using a cyclic redundancy check (CRC) error checking protocol. The received frames are classified as good frames (G), erasure frames (E), or discontinuous frames (D). A numerical value is assigned to each of the frames based on the classification thereof. Next, the frames are filtered to provide an output $Yn = Yn-1 + Xn$ where 'n' is a frame number, Yn is the filter output for a given frame n, Yn-1 is the filter output for a previous frame, and Xn is a stream of input frames. A threshold is set for the output Yn to facilitate the detection of discontinuous frames. That is, a detection of a discontinuous transmission frame is indicated when a frame is classified as an 'erasure' and the filter output exceeds the threshold. On the detection of a discontinuous frame, the classification of the frame is changed from 'erasure' to 'discontinuous'. By reclassifying improperly classified erasure frames, the mobile receiver is inhibited from requesting retransmission of the frames or a change in the transmit power level. Consequently, network throughput and capacity are optimized and system power is conserved.

27 Claims, 4 Drawing Sheets

SYSTEM AND METHOD FOR DTX FRAME DETECTION

BACKGROUND OF THE INVENTION

1. Field of Invention

This application claims priority to U.S. patent application Ser. No. 60/215,377, filed on Jun. 29, 2000. This invention relates to communications systems. Specifically, the present invention relates to systems and methods for detecting DTX frames in communications systems.

2. Description of the Related Art

Cellular telecommunications systems are characterized by a plurality of transceivers in mobile phones and base stations. Each transceiver includes a transmitter and a receiver which communicate over a channel.

One approach to increasing the information-carrying capacity of the channel is to enhance the signal-to-interference ratio (SIR). The SIR is often expressed as a ratio of the energy per information bit received to the interference density of the received signal. To increase system capacity, the transceivers operate at low signal-to-interference ratios (SIRs). As an alternative, the SIR of the channel can be increased. To increase the SIR, the power of the transmitted signal is increased by a signal from the receiving transceiver. However, increases in transmitted power lead to increases in interference to other mobiles and thereby limit the capacity of the channel. In addition, increases in transmitted power levels increase power consumption (particularly problematic at battery powered mobile units) and reduce network throughput. Accordingly, it is generally desirable to operate the system at an optimal transmit power level that balances signal-to-interference considerations with power consumption, throughput and system capacity considerations.

As will be appreciated by those skilled in the art, data is transmitted in intervals referred to as 'frames'. In accordance with the new IS2000 cellular standard, a base station can assign more channels to the mobile and transmit on the supplemental channels. However, if the base station has no data to transmit, under the new standard, instead of de-assigning the channel, the base station just reduces the signal gain. This is referred to as a 'DTX' mode and frames transmitted in this mode are 'DTX' frames.

Unfortunately, the effort to operate the system at optimal transmit power levels is impeded by the transmission of DTX frames. The receiving unit demodulates the data bits in the frame, monitors power over the frame, checks the quality of the frame, and performs CRC (cyclic redundancy check) error checking. If the CRC check fails, bit errors are assumed the receiver erases the frame and sends a signal to the transmitter to increase the transmit power and resend the frame.

Accordingly, when the receiver receives a DTX frame, it attempts decode the frame, a frame of noise and interference. This causes the receiver, i.e., the mobile unit, to send plural erased frame signals to the base station. In response, the base station increases the power set point for the mobile, which increases power consumption while reducing network throughput and capacity.

Conventional systems and methods for rate determination and detection of erasure look at each frame individually and have heretofore offered limited performance. Accordingly, a need remains in the art for a system or method for distinguishing between DTX frames and frames with high bit error rates suitable for erasure in the transmission of data between a base station and a mobile unit in order to achieve optimal transmit power levels.

SUMMARY OF THE INVENTION

The need in the art is addressed by the system and method of the present invention for detecting discontinuous transmission (DTX) frames. The inventive method includes the steps of receiving data transmitted in a plurality of frames; classifying each of the frames; analyzing the classification of a number of successive frames of the received data and providing a metric with respect thereto; and determining, in response to the metric, if a frame is a discontinuous frame.

In the illustrative embodiment, the step of classifying includes the step of error checking the frames using a cyclic redundancy check (CRC) error checking protocol. The received frames are classified as good frames (G), erasure frames (E), or discontinuous frames (D). A numerical value is assigned to each of the frames based on the classification thereof. Next, the frames are filtered to provide an output $Y_n = Y_{n-1} + X_n$ where 'n' is a frame number, $Y_n$ is the filter output for a given frame n, $Y_{n-1}$ is the filter output for a previous frame, and $X_n$ is a stream of input frames. A threshold is set for the output $Y_n$ to facilitate the detection of discontinuous frames. That is, a detection of a discontinuous transmission frame is indicated when a frame is classified as an 'erasure' and the filter output exceeds the threshold. On the detection of a discontinuous frame, the classification of the frame is changed from 'erasure' to 'discontinuous'. By reclassifying improperly classified erasure frames, the mobile receiver is inhibited from requesting retransmission of the frames or a change in the transmit power level. Consequently, network throughput and capacity are optimized and system power is conserved.

DESCRIPTION OF THE INVENTION

Illustrative embodiments and exemplary applications will now be described with reference to the accompanying drawings to disclose the advantageous teachings of the present invention.

As mentioned above, the DTX (discontinuous transmission) mode for SCH (supplemental code channel) and DCCH (dedicated control channel) is a common feature introduced in IS2000 standard. In accordance with the standard, the base station (BS) can switch its transmitter power between two predefined levels (one of that may be a zero level corresponding to no power transmitted at all). This will result in a noise + interference only input to the demodulator and decoder of the receiver for that particular SCH or DCCH. The MS (mobile station) should be able to properly determine the beginning of DTX mode and qualify these no transmission frames as such.

One problem on the MS side is that these DTX frames will fail CRC (cyclic redundancy code) test or return the frame quality indicator equal to zero. The CRC will also be zero if normal (non-DTX) frames are transmitted and are received with bit errors. A conventional MS regular RDA (rate determination algorithm) can, typically, efficiently select and erase the continuously transmitted frames with bit errors. Thus, the RDA implemented in software (SW) can process hardware (HW) status registers (decoder and demodulator registers dedicated to frame demodulation and status) and output a rate decision or an erasure. However, conventional RDAs are not optimized for DTX frame detection and, in particular, conventional RDAs do not perform optimally in that they fail to distinguish between continuous transmission erasures (continuously transmitted frames with bit errors) and DTX frames.

Any incorrect classification of DTX frame as an erasure will cause problems with power control since the MS will report these frames as erasures (or bad frames) and request more power on the forward link (FL). Several methods can be used to make some reasonable decisions on DTX frames. However, inasmuch as these approaches have been less than fully effective, the present teachings are provided to address the need in the art.

Figure 1:
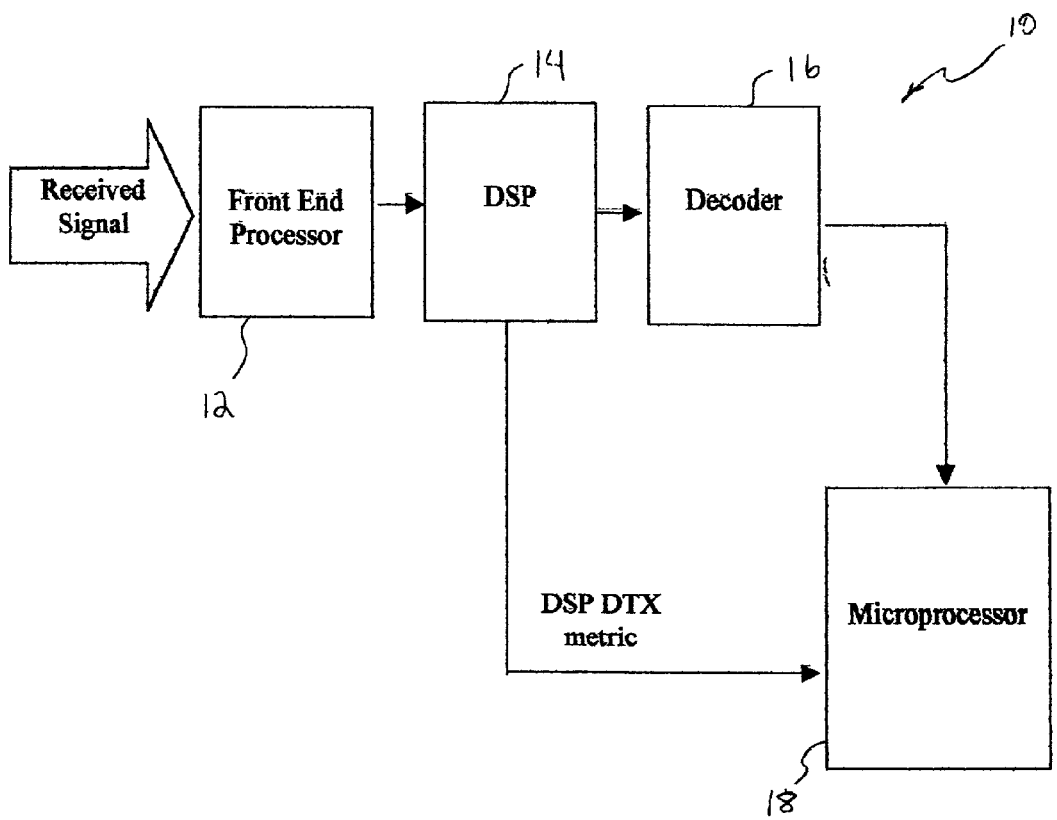
FIG. 1 is a simplified block diagram of a receiver incorporating the teachings of the present invention.

FIG. 1 is a simplified block diagram of a receiver incorporating the teachings of the present invention. The receiver 10 includes an MSM (Mobile Station Modem) chip level processing stage 12, which includes finger front end pseudo-noise (pn) processing. After the pn code is removed from each finger, the received signal is processed by a symbol level processor 14 implemented as a digital signal processor (DSP). The DSP 14 converts the symbols into data bits. The data bits are output to a decoder 16, which in an illustrative CDMA (code division multiple access) system, performs speech (e.g. Viterbi) or data decoding. The DSP 14 also computes a frame type metric that is used to identify DTX frames in the manner described more fully below. The metric is computed for every frame and is output to a microprocessor 18. While the present invention is not limited to the method used to compute the DTX metric, in the best mode, the following method is used.

Problem Formulation:

The detection problem is modeled as a binary hypothesis test for a frame that fails CRC as follows:

$H_0$: the received frame is a zero frame $H_1$: the received frame is a transmitted frame The decision rule is to compare some metric M with threshold T such that the received frame is decided to be a transmitted frame if M>T; zero frame otherwise.

The detection probability and false alarm probability are defined as Prob(M>T|$H_1$ is correct), and Prob(M>T|$H_0$ is correct), respectively.

Analysis of DTX Metrics

The re-encoded symbol energy metric obtained from decoder (16) is calculated as follows:

$$E_{decoder} = \sum_{i=1}^{N} s_i \cdot r_i \quad [1]$$

where:

$s_i$ is the soft decision received by the decoder $r_i$ is the re-encoded symbols for convolutional code or the systematic symbols for turbo code, and N is the total number of symbol used to compute the energy metric.

It can be shown that the energy metric has the following relationship with $E_b/I_o$ and $E_{cp}/I_o$:

$$E_{decoder} \propto \sqrt{\frac{E_b}{I_o} \cdot \frac{E_{cp}}{I_o}} \quad [2]$$

Similarly, the energy metric computed by the demodulator also has the same relationship with $E_b/I_o$ and $E_{cp}/I_o$, i.e., $$E_{demodulator} = \sum_{i=1}^{N} |s_i| \propto \sqrt{\frac{E_b}{I_o} \cdot \frac{E_{cp}}{I_o}}, \quad [3]$$

Clearly, the energy metric is not a good metric because it is sensitive to the pilot strength and the geometry. To remove the dependency on pilot strength we can divide the energy metric by the pilot strength estimate EcpIo provided by the FPC (Fast Power Control), i.e., $$EbIo = \frac{E^2}{EcpIo} \propto \frac{E_b}{I_o} \text{ where } EcpIo \propto \frac{E_{cp}}{I_o} \quad [4]$$

However, the EbIo metric is still sensitive to the geometry.

The $E_b/N_t$ estimate seems to be a better candidate for SCH DTX if the SCH is well power controlled by the FPC, which will try to control $E_b/N_t$ to reach some target. Let's denote the metric that uses the $E_b/N_t$ estimate by EbNt. It can be calculated by dividing the energy metric by the weighted_NtIo provided by the FPC, i.e.:

$$EbNt = \frac{E^2}{\text{weighted\_NtIo}} \propto \frac{E_b}{N_t} \quad [5]$$

where:

$$\text{weighted\_NtIo} \propto \frac{N_t}{N_o} \cdot \frac{E_{cp}}{I_o}$$

Figure 2:
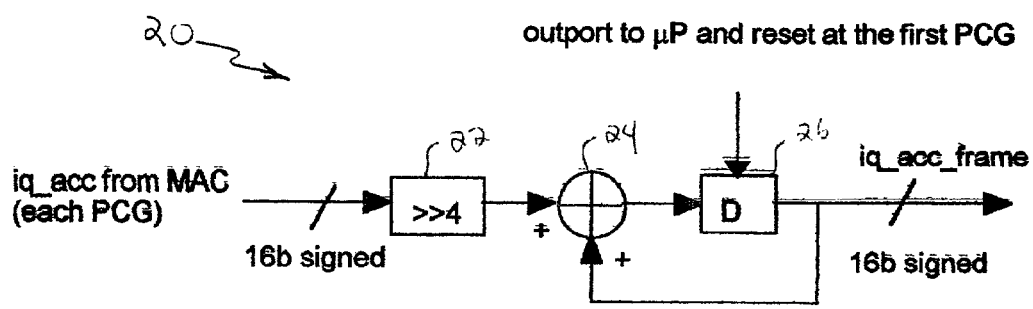
FIG. 2 is a simplified logic diagram showing an illustrative arrangement for computing iq_acc_frames in accordance with the illustrative method for identifying DTX frames.
Figure 3:
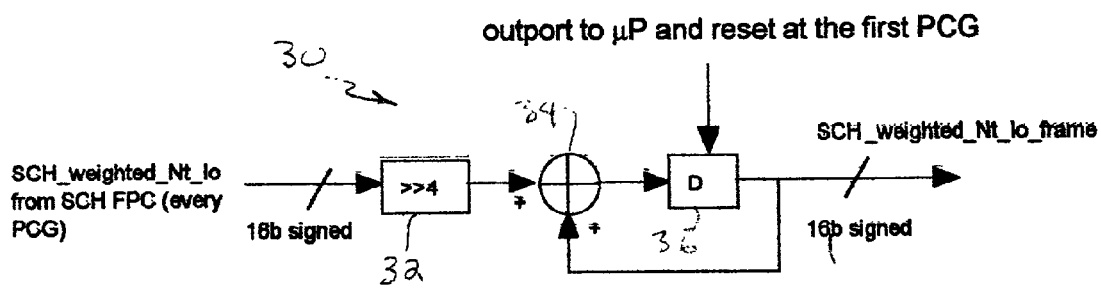
FIG. 3 is a simplified logic diagram showing an illustrative arrangement for computing SCH_weighted_Nt_Io_frames in accordance with the illustrative method for identifying DTX frames.
Figure 4:
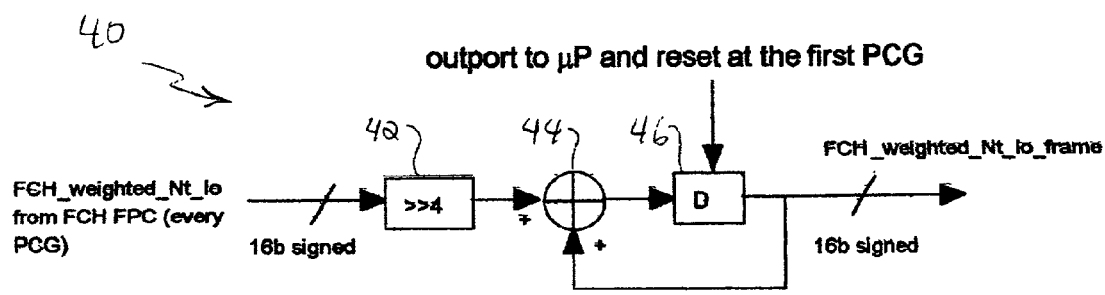
FIG. 4 is a simplified logic diagram showing an illustrative arrangement for computing FCH_weighted_Nt_Io_frame in accordance with the illustrative method for identifying DTX frames.

Implementation:

FIGS. 2–4 show the data path to implement the DTX detection for SCH and DCCH. FIG. 2 is a simplified logic diagram showing an illustrative arrangement for computing iq_acc_frames in accordance with the illustrative method for identifying DTX frames.

FIG. 3 is a simplified logic diagram showing an illustrative arrangement for computing SCH_weighted_Nt_Io_frames in accordance with the illustrative method for identifying DTX frames.

FIG. 4 is a simplified logic diagram showing an illustrative arrangement for computing FCH_weighted_Nt_Io_frame in accordance with the illustrative method for identifying DTX frames.

Figure 5:
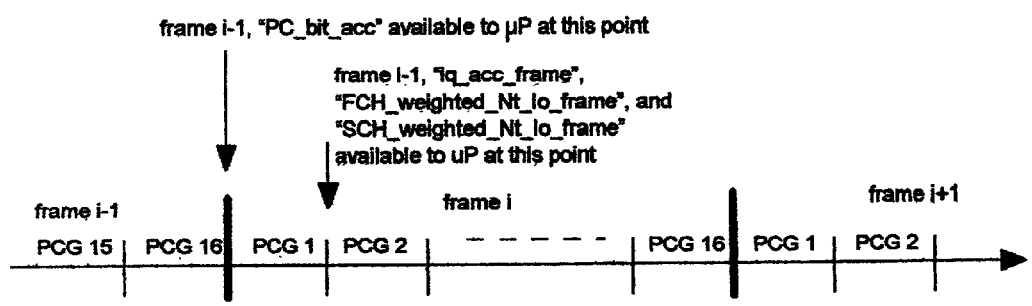
FIG. 5 is an illustrative microprocessor read timing diagram in accordance with the methods of the present invention.
Figure 6:
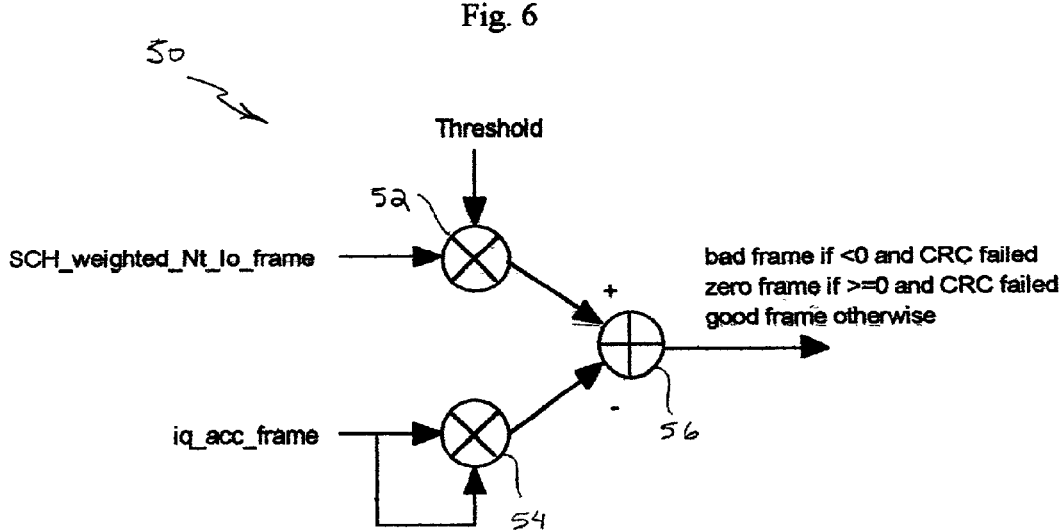
FIG. 6 is a diagram that illustrates a method to detect zero frames in accordance with the present teachings.

Software Changes:

FIG. 5 is an illustrative microprocessor read timing diagram in accordance with the methods of the present invention. FIG. 6 is a diagram that illustrates a method to detect zero frames in accordance with the present teachings. In FIG. 5, notice that the PC_bit_acc is available right after the last PCG (Power Control Group: 1 frame=16 PCGs) of the current frame since it is accumulating only the PC (Power control) bits. However, the iq_acc_frame for SCH is delayed until the first PCG of the next frame because the symbol energy of the last PCG won't be available to the QDSP before the end of current frame. After the microprocessor 18 reads these values from the DSP 14, i.e., iq_acc_frame, SCH_weighted_Nt_Io_frame, PC_bit_acc and FCH_weighted_Nt_Io_frame, it will perform the computations shown in FIG. 6 to detect zero frames.

Hence, with reference to FIG. 1, the microprocessor 18 processes the frame information provided by the decoder 16 and the DTX metric provided by the DSP 14, makes the final decision about the frame type, decides whether to erase each frame or not and implements the novel method of the present invention.

Figure 7:
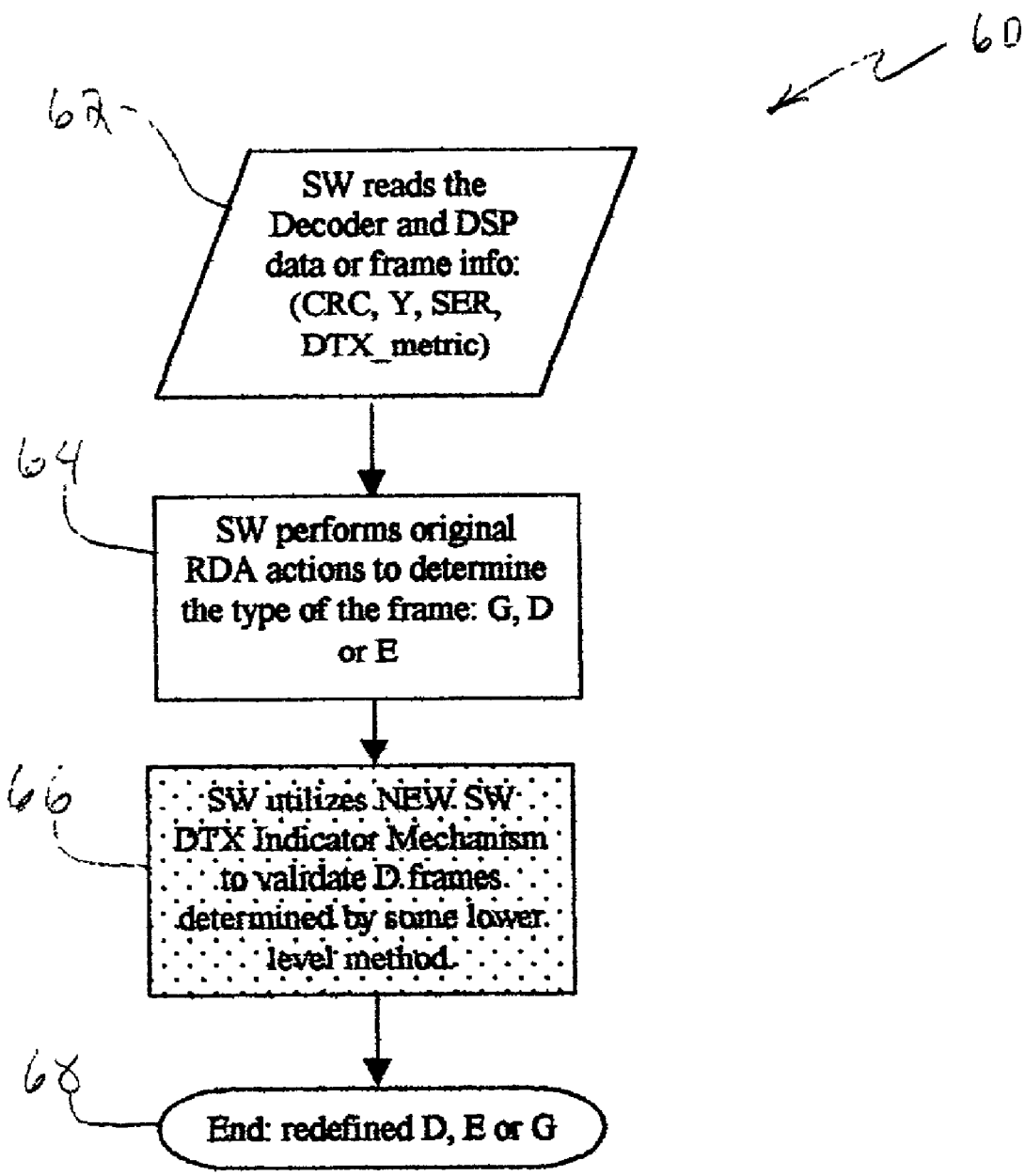
FIG. 7 is a flow diagram of an illustrative implementation of the method of the present invention in software.

FIG. 7 is a flow diagram of an illustrative implementation of the method of the present invention in software. The inventive method (depicted at 60) includes the steps of reading the decoder and DSP data and frame information with respect to CRC, Yamamoto (Y), symbol error rate (SER) and the DTX metric at step 62. At step 64, the software performs original rate determination actions to determine the type of frame G, D, or E. Rate determination algorithms are well known in the art. See for example U.S. Pat. No. 5,751,725 issued May 12, 1998 to T. Chen and entitled Method and Apparatus for Determining the Rate of Received Data in a Variable Rate Communications System and U.S. Pat. No. 5,774,496 issued Jun. 30, 1996 to B. Butler et al., and entitled Method and Apparatus for Determining Data Rate of Transmitted Variable Rate Data in a Communications Receiver. The frame type is identified in accordance with the method described above, or with any suitable method.

Next, at step 66, the DTX indication method of the present invention is implemented. The Input into this step is G, D or E frame type determined at step 64.

The algorithm performs the filtering defined as following: The filter type is simple infiniteimpulse response (IIR):

$$Y(n)=Y(n-1)+X(n) \quad [6]$$

where 'n' is the frame number, 'Y' is the DTX indicator, 'X' is the input {D, G, or E}.

The method presets the following values every time the new SCH or DCCH channel is assigned to the mobile station: $Y(-1)=-1$; $D=+1$, $G=-3$; $E=-1$; $n=-1$ In the illustrative implementation, for every new frame output by the decoder the following steps are performed:

The frame index is incremented: $n=n+1$;

The DTX frame indicator is computed using: $Y(n)=Y(n-1)+X(n)$

The DTX frame indicator is saturated on both positive and negative sides: If $(Y(n)>3)$ $Y(n)=3$ and If $(Y(n)<-1)Y(n)=-1$;

Compare DTX frame indicator with the predefined threshold: if the frame type is E and $Y(n)>-1$, change the frame type to D, otherwise do nothing.

In short, inventive method includes the steps of receiving data transmitted in a plurality of frames; classifying each of the frames; analyzing the classification of a number of successive frames of the received data and providing a metric with respect thereto; and determining, in response to the metric, if a frame is a discontinuous frame.

In the illustrative embodiment, the step of classifying includes the step of error checking the frames using a cyclic redundancy check (CRC) error checking protocol. The received frames are classified as good frames (G), erasure frames (E), or discontinuous frames (D). A numerical value is assigned to each of the frames based on the classification thereof. Next, the frames are filtered to provide an output $Yn=Yn-1+Xn$ where 'n' is a frame number, Yn is the filter output for a given frame n, Yn−1 is the filter output for a previous frame, and Xn is a stream of input frames. A threshold is set for the output Yn to facilitate the detection of discontinuous frames. A detection of a discontinuous transmission frame is indicated when a frame is classified as an 'erasure' and the filter output exceeds the threshold. On the detection of a discontinuous frame, the classification of the frame is changed from 'erasure' to 'discontinuous'. By reclassifying improperly classified erasure frames, the mobile receiver is inhibited from requesting retransmission of the frames or a change in the transmit power level. Consequently, network throughput and capacity are optimized and system power is conserved.

Thus, the present invention has been described herein with reference to a particular embodiment for a particular application. Those having ordinary skill in the art and access to the present teachings will recognize additional modifications applications and embodiments within the scope thereof. For example, while the present teachings are disclosed with reference to CDMA type systems, the invention is not limited thereto. The present teachings may be utilized with other communications technologies such as TDMA or GSM without departing from the scope of the present teachings.

It is therefore intended by the appended claims to cover any and all such applications, modifications and embodiments within the scope of the present invention.

Accordingly,

What is claimed is:

1. A system for detecting discontinuously transmitted (DTX) frames comprising:
    first means for receiving data transmitted in a plurality of frames;
    second means for classifying each of the frames;
    third means for analyzing the classification of a number of successive frames of the received data and providing a metric with respect thereto, said third means including an infinte impulse response filter (IIR) having an output clamped between two predetermined values for a predetermined number of past and present frames; and
    fourth means, responsive to the metric, for determining if a frame is a DTX frame, including reclassifying improperly classified erasure frames to be DTX frames, thereby inhibiting a mobile receiver from requesting retransmission of the frames or a change in transmit power level.

2. The system of claim 1 wherein the second means includes means for error checking the frames.

3. The system of claim 2 wherein the means for error checking includes means for performing a cyclic redundancy check.

4. The system of claim 3 wherein the second means includes means for classifying the frames as good frames, erasure frames, or DTX frames.

5. The system of claim 3 further including means for assigning a numerical value to each of the frames based on the classification thereof.

6. The system of claim 5 wherein the filter is of the form $Y_n = Y_{n-1} + X_n$ where 'n' is a frame number, $Y_n$ is the filter output for a given frame n, $Y_{n-1}$ is the filter output for a previous frame, and $X_n$ is a stream of input frames.

7. The system of claim 6 further including means for setting a threshold for the output $Y_n$ of the filter.

8. The system of claim 7 further including means for outputting an indication of a detection of a DTX frame when the filter output exceeds the threshold.

9. The system of claim 7 wherein the fourth means reclassifies an improperly classified erasure frame to be a DTX frame if the frame was classified as an erasure frame and the output of the filter exceeds the threshold.

10. A communications system comprising:
a transmitter adapted to transmit frames of data, at least some of the frames being discontinuous transmission (DTX) frames;
a receiver adapted to receive and classify the transmitted frames;
a processor;
an infinite impulse response filter having an output clamped between two predetermined values for a predetermined number of past and present frames; and
software running on the processor for analyzing the classification of a number of successive frames of the received data and providing a metric with respect thereto, for determining, in response to the metric, if a frame is a discontinuously transmitted frame, and for reclassifying improperly classified erasure frames to be DTX frames, and thereby inhibiting a mobile receiver front requesting retransmission of the frames or a change in transmit power level.

11. The communications system of claim 10 wherein the system includes an error checking mechanism.

12. The communications system of claim 11 wherein the error checking mechanism includes means for performing a cyclic redundancy check.

13. The communications system of claim 12 wherein the system includes means for classifying the frames as good frames, erasure frames, or DTX frames.

14. The communications system of claim 10, wherein the software further includes means for assigning a numerical value to each of the frames based on the classification thereof.

15. The communications system of claim 14 wherein the filter is of the form $Y_n = Y_{n-1} + X_n$ where 'n' is a frame number, $Y_n$ is the filter output for a given frame n, $Y_{n-1}$ is the filter output for a previous frame, and $X_n$ is a stream of input frames.

16. The communications system of claim 15 further including means for setting a threshold for the output $Y_n$ of the filter.

17. The communications system of claim 16 further including means for outputting an indication of a detection of a DTX frame when the filter output exceeds the threshold.

18. The communications system of claim 17 wherein the software operates for changing the frame classification to DTX if the frame was classified as erasure and the output of the filter exceeds the threshold.

19. A method for detecting discontinuous transmission (DTX) frames comprising:
receiving data transmitted in a plurality of frames;
classifying each of the frames, wherein said classifying includes computing a filter output: $Y_n = Y_{n-1} + X_n$ where 'n' is a frame number, $Y_n$ is the filter output for a given frame n, $Y_{n-1}$ is the filter output for a previous frame, and $X_n$ is a stream of input frames, said filter output being clamped between two predetermined values for a value of n within a predetermined range;
analyzing the classification of a number of successive frames of the received data and providing a metric with respect thereto; and
determining, in response to the metric, if a frame is a DTX frame, including reclassifying improperly classified erasure frames to be DTX frames, thereby inhibiting a mobile receiver from requesting retransmission of the frames or a change in transmit power level.

20. The invention of claim 19 wherein said classifying includes error checking the frames.

21. The communications system of claim 20 wherein said error checking includes performing a cyclic redundancy check.

22. The communications system of claim 21 wherein said classifying includes classifying the frames as good frames, erasure frames, or DTX frames.

23. The communications system of claim 22 further including assigning a numerical value to each of the frames based on the classification thereof.

24. The communications system of claim 23 wherein said classifying includes computing a filter output: $Y_n = Y_{n-1} + X_n$ where 'n' is a frame number, $Y_n$ is the filter output for a given frame n, $Y_{n-1}$ is the filter output for a previous frame, and $X_n$ is a stream of input frames.

25. The communications system of claim 24 further including setting a threshold for the output $Y_n$.

26. The communications system of claim 25 further including outputting an indication of a detection of a DTX frame when the filter output exceeds the threshold.

27. The communications system of claim 26 wherein said reclassifying frames includes changing the frame classification to discontinuous if the frame was classified as erasure and the output of the filter exceeds the threshold.

* * * * *